United States Patent [19]

Kang

[11] Patent Number: 5,636,433
[45] Date of Patent: Jun. 10, 1997

[54] METHOD OF MANUFACTURING A MAGNETIC HEAD

[75] Inventor: Nam S. Kang, Seoul, Rep. of Korea

[73] Assignee: Goldstar Co., Ltd., Rep. of Korea

[21] Appl. No.: 391,298

[22] Filed: Feb. 21, 1995

Related U.S. Application Data

[62] Division of Ser. No. 142,279, Oct. 28, 1993, abandoned.

[30] Foreign Application Priority Data

Oct. 30, 1992 [KR] Rep. of Korea ............ 1992-20211

[51] Int. Cl.⁶ ............ G11B 5/235; G11B 5/127; H01F 10/08
[52] U.S. Cl. ............ 29/603.14; 29/603.15; 29/603.21
[58] Field of Search ............ 360/122, 119, 360/126; 29/603.15, 603.13, 603.14, 603.21, 603.2

[56] References Cited

U.S. PATENT DOCUMENTS

| | | | |
|---|---|---|---|
| 4,670,972 | 6/1987 | Sakakima | 29/603 |
| 4,731,683 | 3/1988 | Otomo et al. | 360/119 |
| 4,972,285 | 11/1990 | Otomo et al. | 360/120 |
| 5,047,885 | 9/1991 | Zama et al. | 360/126 |

OTHER PUBLICATIONS

IBM TDB vol. 18 No. 12 pp. 3910–3911, May 1976, Smathers.

Primary Examiner—Carl E. Hall

[57] ABSTRACT

A method is provided for manufacturing magnetic heads having excellent magnetic properties comprising the steps of removing a certain thickness of a portion of at least one of the apexes of first and second core halves to form a space therebetween above at least one winding groove, bonding the first and second core halves by filling the space with bonding glass, and applying a first magnetic film on the whole tape sliding surface of the bonded first and second core halves. The first magnetic film is removed from one of the first and second core halves. Then gap material and a second magnetic film are applied in sequence on the whole tape sliding surface. The whole tape sliding surface is lapped until the first magnetic film is exposed, and the second magnetic film is spaced from the first magnetic film by the gap material.

17 Claims, 4 Drawing Sheets

METHOD OF MANUFACTURING A MAGNETIC HEAD

This is a divisional of application Ser. No. 08/142,279, filed Oct. 28, 1993, now abandoned.

FIELD OF THE INVENTION

This invention relates to magnetic heads used in a video cassette recorder and the like, more particularly to a method of fabricating the magnetic heads having excellent magnetic properties.

BACKGROUND OF THE INVENTION

The trend of technological development in magnetic recording using magnetic heads advances to high frequency and high density recording. To make denser record, the recording medium used in magnetic tape, magnetic disc and the like should be of material having high magnetic coercive force (Hc), but the high magnetic coercive force should accompany with high saturation magnetism of magnetic heads corresponding to the high magnetic coercive force. It is possible to record only when the saturation magnetism of magnetic heads is 5 to 8 times higher than the magnetic coercive force of the medium. Iron oxide family tape having a magnetic coercive force of 500–800 Oe is used currently with ferrite family magnetic heads having a saturation magnetism of 5000 Gauss.

However, because recording with magnetic heads employing ferrite is not easy on media used in 8 mm video camera and digital audio tape recorders have a magnetic coercive force of 1500 Oe, metal in gap (MIG) heads have been developed which are magnetic heads having a thin film of metal of high saturation magentism between the head gap.

Shown in FIG. 1 is a perspective view of a conventional MIG head, wherein 1a and 1b ere core halves to make one core together, 2 is bonding glass and 3 is ferromagnetic film.

Sendust alloy (Fe-Al-Si) having good thermal stability and strong corrosion resistance is mostly used for the ferromagnetic film 3, and the forming of the film is carried out by sputtering. The bonding glass 2 bonding the core haves 1a and 1b is material of high wear resistance and high corrosion resistance, and requires heating at 500°–700° C. to melt in bonding the halves 1a and 1b.

However, the heating causes the problem of the occurence of inter-diffusion between the surfaces of the ferrite blocks 1a and 1b and the ferromagnetic film 3, which results to generate pseudo-gap noise, an impediment in recording/ reproduction. And the metal magnetic film 3 tends to deteriorate it/high temperature resulting in a drop of the output due to reaction with the glass 2. Consequently, it is current situation of magnetic head manufacture to employ metal magnetic film materials having good high temperature properties though the magnetic properties are more or less low. It has not been possible to use materials having good magnetic properties but with low thermal stability.

SUMMARY OF THE INVENTION

The object of this invention is to provide a method of manufacturing magnetic heads employing amorphous magnetic films having good magnetic properties, though the thermal stability is more or less low.

Another object of this invention is to provide a method of manufacturing magnetic heads which can prevent generation of a pseudo-gap noise.

These and other objects are achieved by providing a method of manufacturing a magnetic head comprising steps of removing a certain thickness of a portion of at least one of the apexes of first and second core halves to form a space therebetween above at least one winding groove, bonding the first and second core halves by filling the space with bonding glass, applying a first magnetic film on the whole tape sliding surface of the bonded first and second core halves, removing the first magnetic film from one of the pair of core halves, applying gap material and a second magnetic film in sequence on the whole tape sliding surface, and lapping the whole tape sliding surface until the first magnetic film is exposed and the second magnetic film is spaced from the first magnetic film by the gap material.

DETAILED DESCRIPTION OF THE INVENTION

Figure 2:
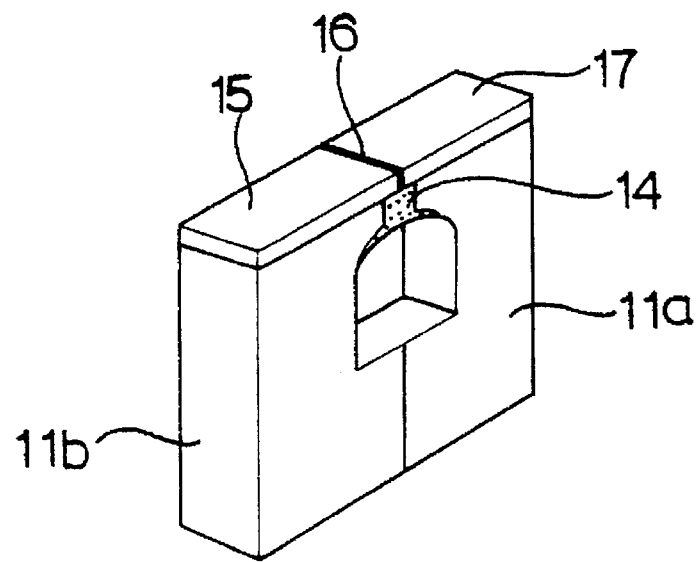
FIG. 2 is a perspective view of a magnetic head in accordance with this invention.

Shown in FIG. 2 is a perspective view of a magnetic head in accordance with this invention which includes core halves 11a and 11b bonded with bonding glass 14, ferromagnetic films 15 and 17 formed at whole tape sliding surface of the core halves 11a and 11b and gap material 16 applied between the ferromagnetic films 15 and 17.

FIGS. 3(A) thru 3(I) show a manufacturing process of a magnetic head in accordance with this invention.

Figure 3A:
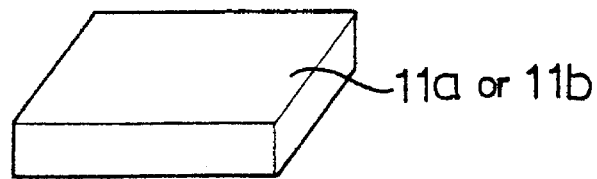
FIGS. 3(A) thru 3(I) show a manufacturing process of a magnetic head in accordance with this invention.
Figure 3B:
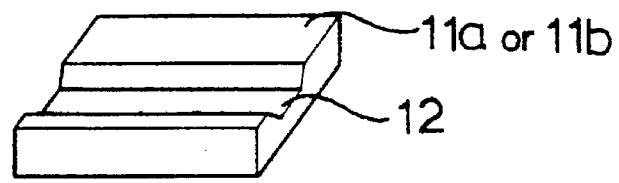
Figure 3C:
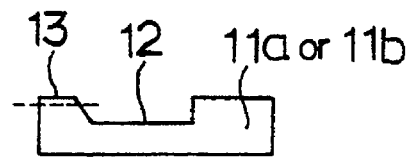
Figure 3D:
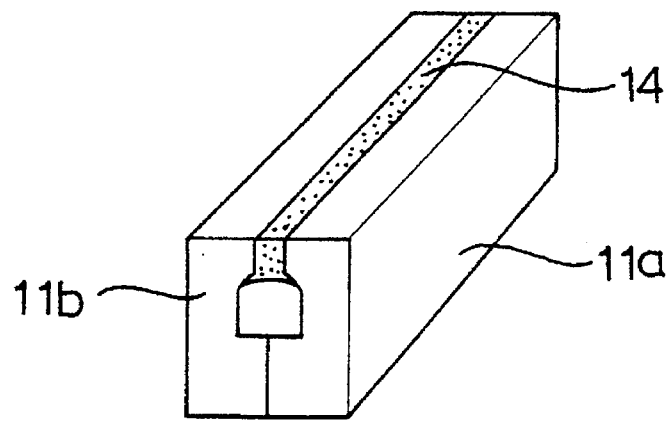

Winding grooves 12 are formed as shown in FIG. 3(B) on core halves 11a and 11b made of Mn-Zn ferrite single crystal as shown in FIG. 3(A). Then a certain thickness of apexes 13 of the core halves 11a and 11b is ground off (FIG. 3(C)). The forming of the winding groove 12 and the grinding off may be carded out only on one of the core halves 11a or 11b. And, as shown in FIG. 3(D), the core halves 11a and 11b together with a bonding glass 14 inserted between the core halves 11a and 11b are heated at about 650° C. to bond the core halves 11a and 11b with the bonding glass 14.

Figure 3E:
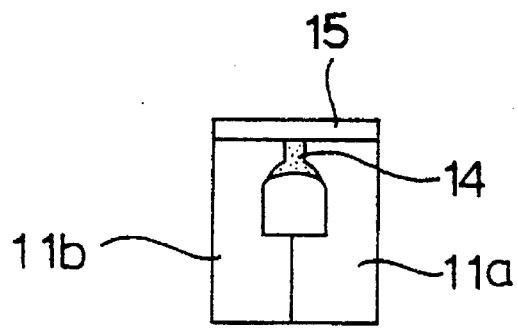
Figure 3F:
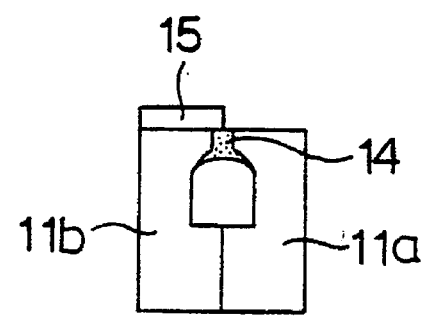
Figure 3G:
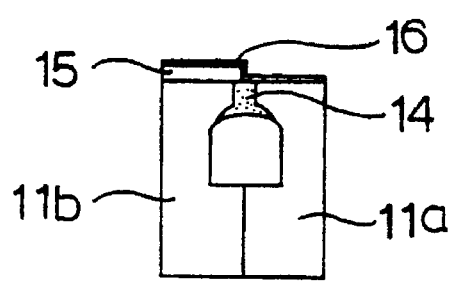

Thereafter, the winding groove 12 is cleaned by lapping and coated with Co-Nb-Zr family amorphous metal magnetic film 15 by a radio frequency magnetron sputtering method as shown in FIG. 3(E). And, the magnetic film 15 on the core half 11a is removed while leaving the magnetic film 15 on the core half 11b as it is, as shown in FIG. 3(F), and gap material of $SiO_2$ film 16 is coated thereon as shown in FIG. 3(G).

Figure 3H:
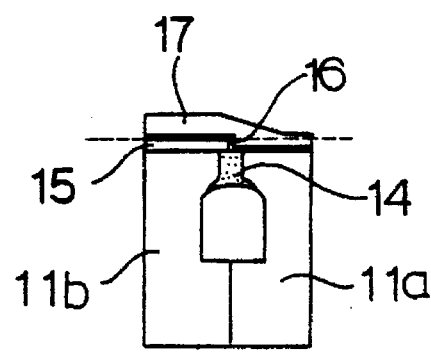
Figure 3:
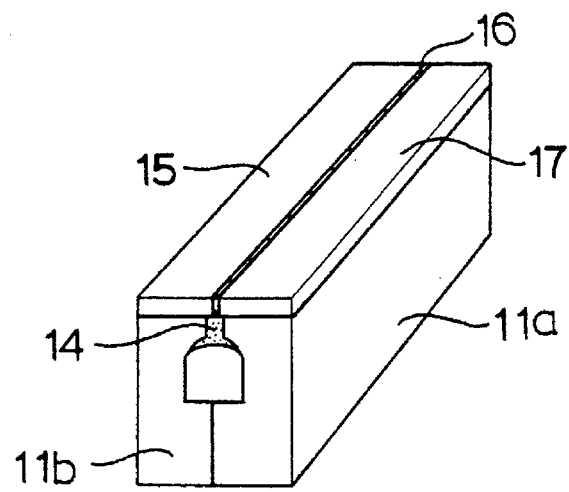

Thereafter, as shown in FIG. 3(H), another metal magnetic film 17 of the same material as the metal magnetic film 15 is coated thereon and then up to the portion shown in dotted line, ie, until the magnetic film 15 is exposed, the metal magnetic film 17 and the $SiO_2$ film 15 is removed flat by lapping, and finally, head chips are obtained by slicing it as shown in FIG. 3(I).

In this invention, the Mn-Zn ferrite single crystal is employed for core blocks 11a and 11b and the Co-Nb-Zr family amorphous magnetic film is employed for ferromagnetic films 15 and 17.

The magnetic materials of Co-Nb-Zr family are crystalize at a temperature over 400° C. resulting the deterioration of magnetic properties, which has impeded manufacturing the magnetic heads with the Co-Nb-Zr family magnetic materials in a conventional method even though the magnetic properties are excellent as shown in following table.

TABLE

| Materials | Bs | He | μ(10nHZ) |
| --- | --- | --- | --- |
| Co—Nb—Zr | 12KG | 0.05 | 3,000 |
| Fe—Si—Al | 10KG | 0.2 | 1,000 |

Figure 1:
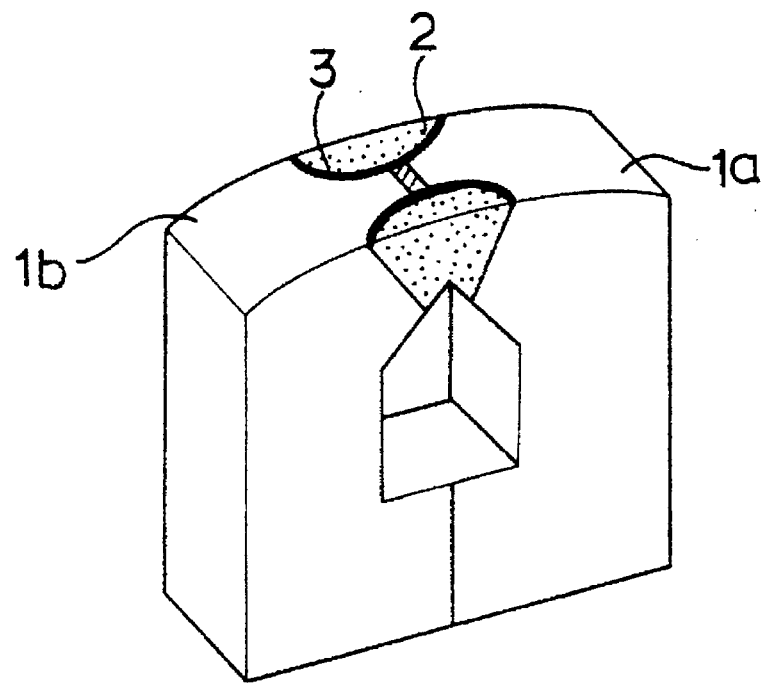
FIG. 1 is a perspective view of a conventional MIG magnetic head.
Figure 4:
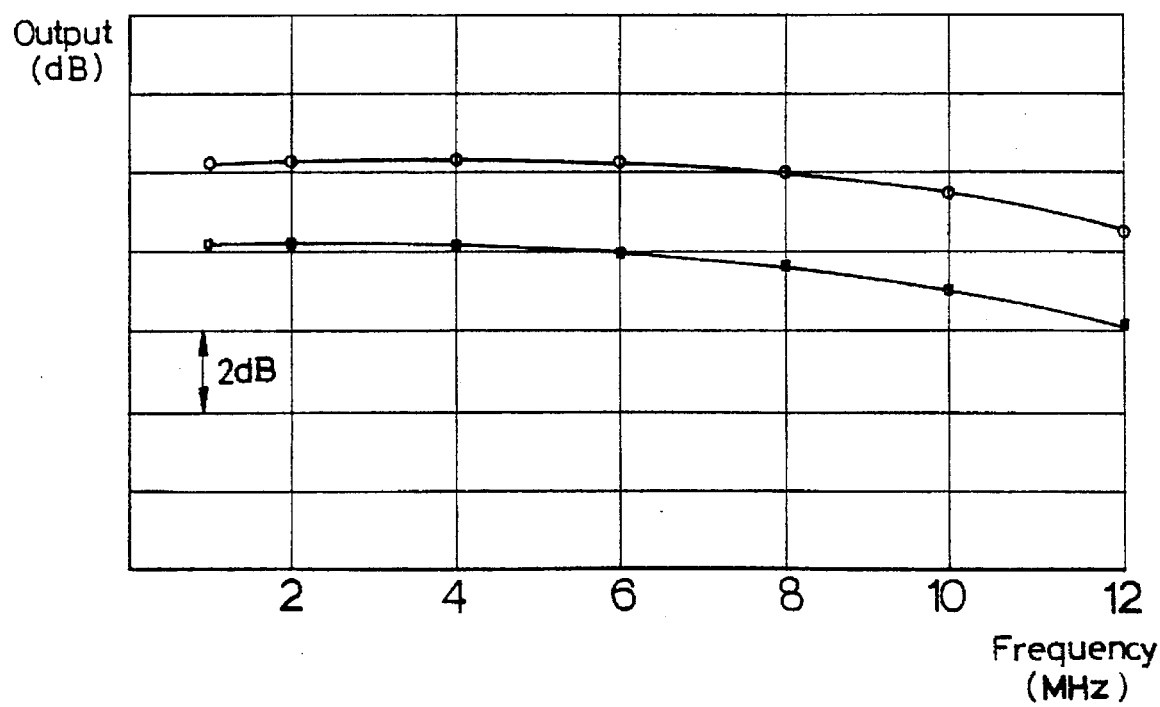
FIG. 4 is a graph showing the output characteristics of the magnetic heads shown in FIG. 1 and FIG. 2, respectively.

FIG. 4 is a graph showing the output characteristics of the magnetic heads shown in FIG. 1 and FIG. 2 respectively, in which the output of the magnetic heads according to this invention is compared to be higher by about 2.5 dB than that of existing MIG heads throughout all the frequency bands.

As described hereinbefore, it becomes possible according to this invention to manufacture magnetic heads without the ferromagnetic film being affected by high temperature because the gap is formed after forming a ferromagnetic film on the whole head sliding surface after bonding the core halves with bonding glass.

Accordingly, this invention provides the advantage of utilizing ferromagnetic film, especially amorphous magnetic film, which has not been possible due to the process involving high temperature. The magnetic heads manufactured in this method make it possible not only to utilize the excellent magnetic properties of amorphous magnetic film without any deterioration but also to achieve high reproduction output and low pseudo-gap noise.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A method for manufacturing a magnetic head, comprising the steps of:

(a) forming a winding groove on at least one of first and second core halves;

(b) removing a certain thickness of a portion of at least one of the apexes of the first and second core halves;

(c) bonding the first and second core halves by filling a space, which is formed by assembling the removed first and second halves, with bonding glass, the filled space being transverse of a tape sliding surface;

(d) applying a first magnetic film on the whole tape sliding surface of the bonded first and second core halves;

(e) removing the first magnetic film from one of the bonded first and second core halves;

(f) sequentially applying a gap material film and a second magnetic film on the whole tape sliding surface; and (g) lapping the whole tape sliding surface until the first magnetic film is exposed, and the second magnetic film is spaced from the first magnetic film by the gap material.

2. The method of claim 1, wherein the bonding step (c) is carried out at a temperature of over 500° C. but below 700° C.

3. The method of claim 1 wherein the gap material is $SiO_2$.

4. The method of claim 1 wherein the first and second magnetic films are applied in steps (d) and (f) by radio frequency magnetron sputtering.

5. The method of claim 1 wherein the first and second magnetic films are Co-Nb-Zn family amorphous magnetic films.

6. The method of claim 1 wherein the core halves are formed of Mn-Zn ferrite single crystal.

7. The method of claim 1 wherein said thickness of said portion of at least one of the apexes of the first and second core halves is removed in step (b) by grinding.

8. The method of claim 1 wherein the first magnetic film is removed in step (e) from one of the first and second core halves by etching.

9. A method for manufacturing magnetic heads, comprising the steps of:

(a) forming a longitudinally extending winding groove on at least one interior surface of first and second elongated core halves;

(b) removing a certain thickness of a portion of at least one of the apexes of the first and second core halves;

(c) bonding the first and second core halves by filling a longitudinally extending space, which is formed by assembling the removed first and second halves, with bonding glass to provide a longitudinally extending tape sliding surface on each one of the first and second core halves separated by a longitudinally extending strip of bonding glass;

(d) applying a first magnetic film on the whole tape sliding surfaces of the bonded first and second core halves;

(e) removing the first magnetic film from one of the first and second core halves;

(f) sequentially applying a film of gap material and a second magnetic film on the whole tape sliding surfaces of the bonded first and second core halves; and (g) lapping the whole tape sliding surfaces of the bonded first and second core halves until the first magnetic film is exposed, and the second magnetic film is spaced from the first magnetic film by the gap material.

10. The method of claim 9, wherein the bonding step (c) is carried out at a temperature of over 500° C. but below 700° C.

11. The method of claim 9 wherein the gap material is $SiO_2$.

12. The method of claim 9 wherein the first and second magnetic films are applied in steps (d) and (f) by radio frequency magnetron sputtering.

13. The method of claim 9 wherein the first and second magnetic films are Co-Nb-Zn family amorphous magnetic films.

14. The method of claim 9 wherein the core halves are formed of Mn-Zn ferrite single crystal.

15. The method of claim 9 wherein said thickness of said portion of at least one of the apexes of the first and second core halves is removed in step (b) by grinding.

16. The method of claim 9 wherein the first magnetic film is removed in step (e) from one of the bonded first and second core halves by etching.

17. The method of claim 9 further comprising the step of:

(h) thereafter transversely cutting the bonded first and second core halves into a plurality of magnetic heads.

* * * * *